(12) United States Patent
Sasamoto et al.

(10) Patent No.: US 10,076,815 B2
(45) Date of Patent: Sep. 18, 2018

(54) PARTS SUPPLY APPARATUS, PARTS SUPPLY METHOD AND ROBOT SYSTEM

(71) Applicant: CANON KABUSHIKI KAISHA, Tokyo (JP)

(72) Inventors: Hiroshi Sasamoto, Tokyo (JP); Shunichi Nagashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/090,785

(22) Filed: Apr. 5, 2016

(65) Prior Publication Data

US 2016/0297612 A1 Oct. 13, 2016

(30) Foreign Application Priority Data

Apr. 7, 2015 (JP) ................................. 2015-078134
Apr. 27, 2015 (JP) ................................. 2015-090175
Mar. 29, 2016 (JP) ................................. 2016-064893

(51) Int. Cl.
| | |
|---|---|
| *B65G 57/00* | (2006.01) |
| *B65G 59/00* | (2006.01) |
| *B65G 3/00* | (2006.01) |
| *B65H 29/00* | (2006.01) |
| *B23Q 7/14* | (2006.01) |
| *B65G 57/30* | (2006.01) |
| *B65G 60/00* | (2006.01) |

(52) U.S. Cl.
CPC ......... *B23Q 7/1494* (2013.01); *B65G 57/301* (2013.01); *B65G 60/00* (2013.01)

(58) Field of Classification Search
CPC .............................. B65G 57/301; B65G 60/00
USPC ....................................................... 414/788.4
See application file for complete search history.

(56) References Cited

U.S. PATENT DOCUMENTS

| | | | |
|---|---|---|---|
| 4,541,762 A | 9/1985 | Tischler et al. | |
| 5,158,424 A * | 10/1992 | Mojden | B65G 47/5181 294/87.1 |
| 5,190,434 A * | 3/1993 | Miura | B23P 19/001 414/416.11 |

(Continued)

FOREIGN PATENT DOCUMENTS

| | | |
|---|---|---|
| DE | 3437127 A1 | 5/1985 |
| DE | 3910705 A1 | 10/1990 |

(Continued)

OTHER PUBLICATIONS

Taiwanese Office Action dated Mar. 24, 2017, in related Taiwanese Patent Application No. 105110775 (with English translation).

(Continued)

*Primary Examiner* — Rakesh Kumar
(74) *Attorney, Agent, or Firm* — Fitzpatrick, Cella, Harper & Scinto

(57) ABSTRACT

A parts supply apparatus includes a supply tray stacking portion where a supply tray containing parts is stacked; a tray raising/lowering unit for separating one of the supply trays from the supply tray stacking portion; a tray holding unit with which the tray raising/lowering unit is provided; and an empty tray stacking portion where an empty tray, which is the supply tray that is emptied after supply of the parts, is stacked. The empty tray stacking portion is disposed above the supply tray stacking portion in a vertical direction.

6 Claims, 10 Drawing Sheets

(56) References Cited

U.S. PATENT DOCUMENTS

| | | | | |
|---|---|---|---|---|
| 5,246,326 | A * | 9/1993 | Boutet | G03B 42/045 414/609 |
| 5,494,399 | A * | 2/1996 | Pearce | B65G 47/71 198/803.15 |
| 6,528,760 | B1 * | 3/2003 | Canella | B23K 26/0838 219/121.68 |
| 6,966,742 | B2 | 11/2005 | Tokita | B65G 47/53 414/789.5 |
| 7,311,488 | B2 * | 12/2007 | Park | H01L 21/67724 414/663 |
| 7,329,083 | B2 * | 2/2008 | Nakazato | B65G 65/00 414/416.01 |
| 7,544,038 | B2 * | 6/2009 | Gerding | B65G 59/063 221/297 |
| 7,585,143 | B2 * | 9/2009 | Hanaoka | B65G 65/00 198/465.3 |
| 7,654,789 | B2 * | 2/2010 | Meier | B65H 31/02 414/791.2 |
| 7,726,460 | B2 * | 6/2010 | Neebe | B65G 65/00 198/346.1 |
| 7,918,641 | B2 * | 4/2011 | Sugiyama | G11B 5/455 414/331.16 |
| 8,931,240 | B2 * | 1/2015 | Lindee | B25J 9/0093 53/251 |
| 9,387,560 | B2 * | 7/2016 | Matsumoto | B23P 19/045 |
| 9,731,853 | B2 * | 8/2017 | Akdogan | B25J 9/1697 |
| 2003/0113200 | A1 * | 6/2003 | Hoe | B65G 57/00 414/788.4 |
| 2009/0035119 | A1 * | 2/2009 | Sugiyama | G11B 5/455 414/788.1 |
| 2009/0323212 | A1 * | 12/2009 | Sugiyama | G11B 5/455 360/31 |
| 2013/0078059 | A1 * | 3/2013 | Enokida | H01L 21/67178 414/222.13 |
| 2013/0287537 | A1 * | 10/2013 | Hecht | G01N 35/04 414/788.4 |
| 2015/0066199 | A1 * | 3/2015 | Shimono | B65G 59/04 700/218 |
| 2016/0297612 | A1 * | 10/2016 | Sasamoto | B23Q 7/1494 |
| 2017/0121109 | A1 * | 5/2017 | Behling | B65G 1/0435 |

FOREIGN PATENT DOCUMENTS

| | | |
|---|---|---|
| JP | 59227625 A | 12/1984 |
| JP | 6112524 A | 1/1986 |
| JP | H06-43213 B2 | 6/1994 |
| JP | H0643213 B2 * | 6/1994 |
| JP | 10322088 A * | 5/1997 |
| JP | 9-208057 A | 8/1997 |
| JP | 10322088 A | 12/1998 |
| JP | H10-322088 A | 12/1998 |
| JP | 2004-345063 A | 12/2004 |
| JP | 2011-240456 A | 12/2011 |
| TW | 200728175 A | 8/2007 |
| TW | 200908078 A | 2/2009 |
| WO | 2014/037993 A1 | 3/2014 |
| WO | 2014/118820 A1 | 8/2014 |

OTHER PUBLICATIONS

Search Report issued in corresponding European Patent Application No. 16164035.4 dated Dec. 1, 2016.
Chinese Office Action issued in corresponding Chinese Application No. 201610212756.1 dated Mar. 22, 2018.

* cited by examiner

PARTS SUPPLY APPARATUS, PARTS SUPPLY METHOD AND ROBOT SYSTEM

BACKGROUND OF THE INVENTION

Field of the Invention

The present invention relates to a parts supply apparatus and a parts supply method that supply a parts to a robot performing an assembly operation and a robot system including the parts supply apparatus.

Description of the Related Art

Generally, there has been known, as a parts supply apparatus for supplying a parts to a robot that performs the assembly operation, a configuration in which the parts are contained in a tray and taken out from the tray to make the robot perform an assembly operation.

In recent years, as progress is made from manual assembly to assembly by robots, there is demand for a parts supply apparatus and a parts supply method by which costs can be reduced, an installation area is reduced so that installation can be made in a limited space, and manufacturing can be performed in a short amount of time so that a good productivity is achieved.

A parts supply apparatus disclosed in Japanese Patent Application Laid-Open No. H09-208057, is configured in such a manner that a robot is disposed to take out a parts from a tray at an uppermost level of trays which are stacked and in which parts are contained, and the tray that has been emptied is then moved by a movable apparatus and the emptied tray is stacked.

However, the apparatus disclosed in Japanese Patent Application Laid-Open No. H09-208057 has a problem that, in order to take out parts from a tray that is stacked and that contains the parts, an empty tray is required to be moved and then stacked so that an installation area increases since an empty tray stacking portion is disposed at another place. Further, it has a problem that a driving mechanism for unstacking, a driving mechanism for moving the emptied tray and a driving mechanism for stacking the empty tray are required to be provided so that costs for the apparatus are high.

A parts supply apparatus and an assembly system disclosed in Japanese Patent Application Laid-Open No. 2011-240456 include a containing shelf for containing a tray and a mechanism for taking out the tray from the containing shelf and performing assembly on the containing shelf to reduce an installation area.

However, the apparatus disclosed in Japanese Patent Application Laid-Open No. 2011-240456, has a problem that since the emptied tray is contained in the containing shelf and then a new tray is taken out, it is required to drive two axes of a horizontal movable mechanism and a vertical movable mechanism so that it takes some time to replace trays and productivity is low.

SUMMARY OF THE INVENTION

It is an object of the present invention to provide a parts supply apparatus and a parts supply method that prevent installation areas of a supply tray stacking portion and an empty tray stacking portion from increasing, that require no driving source for stacking an empty tray at an empty tray stacking portion and that can reduce costs.

In order to attain the above-mentioned object, a parts supply apparatus of the invention includes:
a supply tray stacking portion in which one or more a supply trays containing parts are stacked;
a tray raising/lowering unit for separating one of the supply trays from the supply tray stacking portion;
a tray holding unit provided in the tray raising/lowering unit; and
an empty tray stacking portion in which one or more empty supply trays, which are emptied after supply of the parts, are stacked,
wherein the empty tray stacking portion is disposed above the supply tray stacking portion in a vertical direction.

Further, in order to attain the above-mentioned object, a parts supply method of the invention by a parts supply apparatus including
a supply tray stacking portion in which one or more supply trays containing parts are stacked, a tray raising/lowering unit for separating one of the supply trays from the supply tray stacking portion, and a tray moving unit for moving one of the supply trays that is separated,
the method including the steps of:
stacking, at the supply tray stacking portion, the one or more supply trays containing parts;
separating from the supply tray stacking portion and holding one of the supply trays by the tray raising/lowering unit;
supplying, by the tray raising/lowering unit, the supply tray that is separated in order to supply the parts; and
stacking, at an empty tray stacking portion, one or more empty supply trays that are emptied,
wherein the empty tray stacking portion is disposed above the supply tray stacking portion in a vertical direction.

Furthermore, in order to attain the above-mentioned object, a robot system of the invention includes:
a robot; and
a parts supply apparatus,
wherein the parts supply apparatus includes:
a supply tray stacking portion in which one or more supply trays containing parts are stacked;
a tray raising/lowering unit for separating one of the supply trays from the supply tray stacking portion;
a tray holding unit provided in the tray raising/lowering unit; and
an empty tray stacking portion in which one or more empty supply trays, which are emptied after supply of the parts, are stacked,
wherein the empty tray stacking portion is disposed above the supply tray stacking portion in a vertical direction, and
wherein the robot is provided with a grasp device capable of moving in an x-axis direction and in a y-axis direction, and does not have a z-axis direction.

Further features of the present invention will become apparent from the following description of exemplary embodiments with reference to the attached drawings.

DESCRIPTION OF THE EMBODIMENTS

Figure 1:
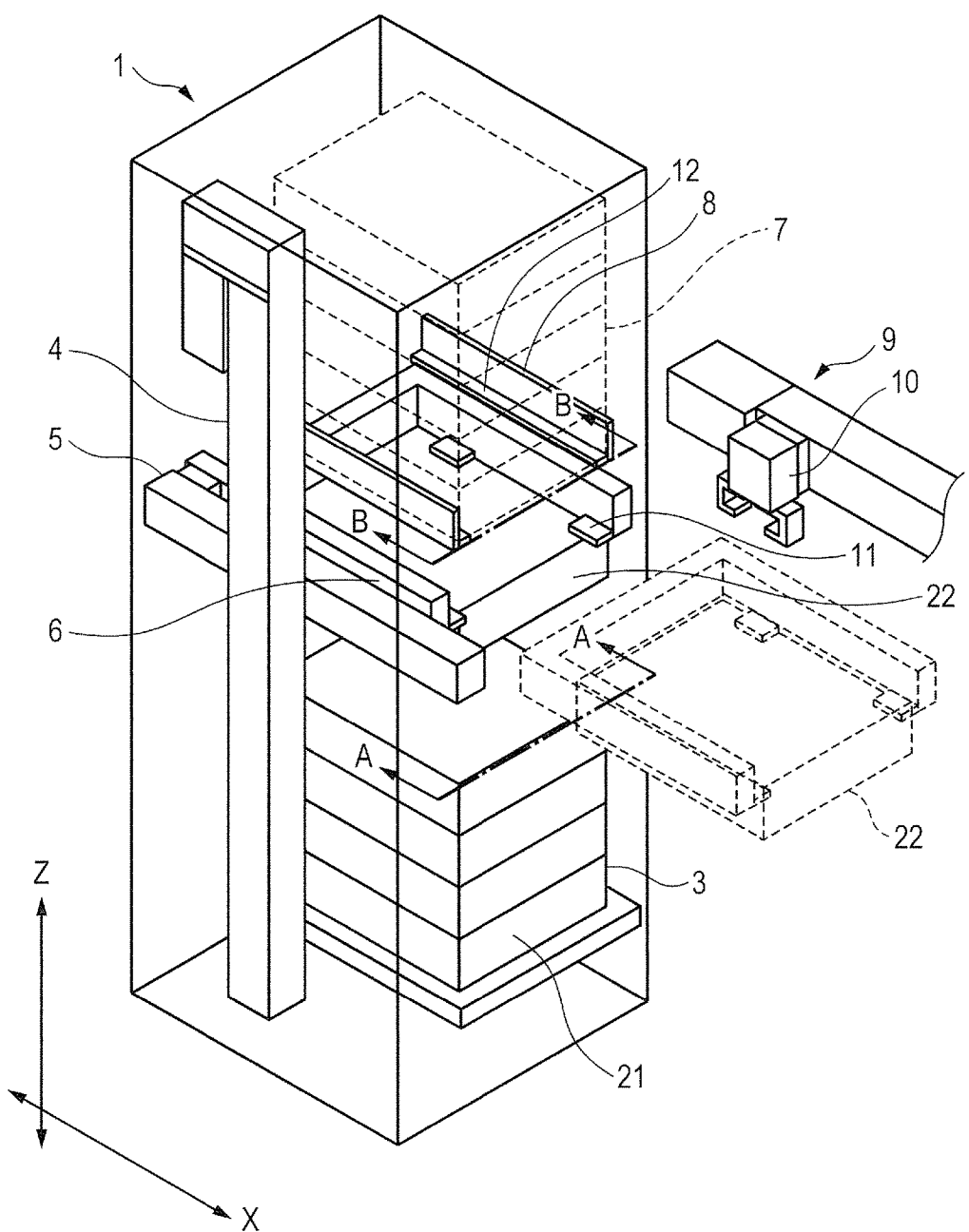
FIG. 1 is a schematic perspective view illustrating a parts supply apparatus according to a first embodiment of the invention.

Preferred embodiments of the present invention will now be described in detail in accordance with the accompanying drawings.

[First Embodiment]

The first embodiment of the invention will be explained below with reference to FIG. 1. In the drawings, the same parts are denoted by the same reference numerals.

FIG. 1 is a schematic perspective view illustrating a parts supply apparatus according to the first embodiment of the invention. The parts supply apparatus 1 includes a supply tray stacking portion 3 where supply trays 21, each of which contains parts (components), are stacked, and an empty tray stacking portion 7 in which empty trays 22, which are the supply trays 21 that are emptied, are stacked. The empty tray stacking portion 7 is disposed above the supply tray stacking portion 3 in a vertical direction.

The parts supply apparatus 1 is constituted by tray raising/lowering unit 4 that separates one (level of) supply tray 21 from the supply tray stacking portion 3, and a tray movement unit 5 that moves the separated supply tray 21 to parts grasp device 10 with which the parts taking out robot 9 is provided. The parts supply apparatus 1 is further constituted by tray holding unit 6 with which the tray raising/lowering unit 4 is provided, and an empty tray stacking unit 8 that holds an empty tray 22 that is the supply tray 21 in which the contained parts are emptied.

Although the supply tray 21 and the empty tray 22 denote reference numerals different from each other for convenience of explanation, they are the same tray. The supply tray 21 includes a main body portion 21a four sides of which are surrounded by a side surface portion 21c. At an upper portion of the side surface portion 21c, a holding portion 21b extends outwardly and is formed flange-like to be held by a tray holding mechanism as described below. Similarly, the empty tray 22 includes a main body portion 22a, four sides of which are surrounded by a side surface portion 22c. At an upper portion of the side surface portion 22c, a holding portion 22b extends outwardly and is formed flange-like to be held by the tray holding mechanism as described below.

The side surface portions 21c and 22c may have a tapered shape which narrows towards a bottom of the supply tray 21, but may be shaped to rise vertically.

An operation in which one supply tray 21 is separated from the supply tray stacking portion 3 by the tray raising/lowering unit 4, then moved to the parts-taking-out robot 9, and in which an empty tray 22, which is the supply tray 21 emptied by supply of the parts, is stacked at the empty tray stacking portion 7, will be explained below.

Figure 2A:
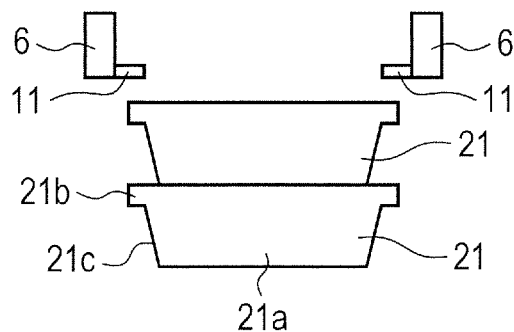
FIGS. 2A, 2B, 2C, 2D and 2E are schematic views explaining a method for separating one supply tray from a supply tray stacking portion according to the first embodiment of the invention.

In FIG. 1, the tray raising/lowering unit 4 provided with the tray holding unit 6 is lowered or raised with respect to the supply tray stacking portion 3 to separate the one supply tray 21. The separation method will be explained with reference to FIGS. 2A, 2B, 2C, 2D and 2E (FIGS. 2A, 2B, 2C, 2D and 2E are schematic views viewed from the direction shown by an arrow A of FIG. 1). In FIG. 2A, multiple supply trays 21 are stacked at the supply tray stacking portion 3. Only two supply trays 21 are illustrated in FIGS. 2A, 2B, 2C, 2D and 2E for convenience of explanation.

Figure 2B:
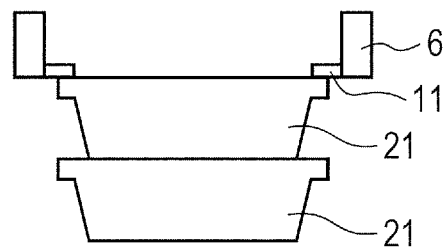

FIG. 2A illustrates a state where the tray holding unit 6, including a tray holding antiback, or one-way mechanism 11, stands by above the supply tray stacking portion 3 in the vertical direction, with respect to the supply tray 21 that contains parts and that is disposed at the uppermost level. FIG. 2B illustrates a state where the tray raising/lowering unit 4 is lowered from the state illustrated in FIG. 2A, and a lower surface of the tray holding antiback mechanism 11 is in contact with an upper surface of the holding portion 21b of the supply tray 21. As described below, the tray holding antiback mechanism 11 and an empty tray stacking antiback, or one-way mechanism 12, provided on the empty tray stacking unit 8, are configured to turn in a single (upward) direction, but not in an opposite (downward) direction relative to a horizontal axis.

Figure 2C:
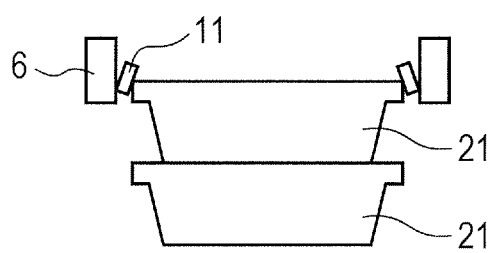
Figure 2D:
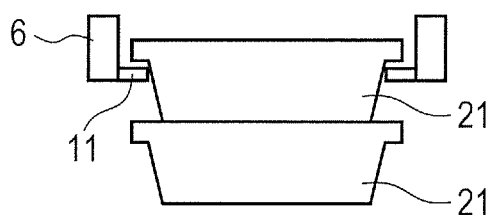

Subsequently, when the tray raising/lowering unit 4 is further lowered, the tray holding antiback mechanism 11 turns to follow the holding portion 21b of the supply tray 21. This state is illustrated in FIG. 2C. The tray raising/lowering unit 4 is further lowered and the tray holding unit 6 comes to a state for lifting up the supply tray 21. This state is illustrated in FIG. 2D. In the state illustrated in FIG. 2D, the tray raising/lowering unit 4 is lowered sufficiently to be in a position where the tray holding antiback mechanism 11 is positioned at a predetermined clearance below the holding portion 21b of the supply tray 21. Lowering of the tray raising/lowering unit 4 is stopped in this state.

Figure 2E:
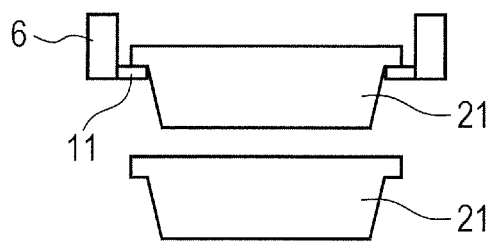

Then, the tray raising/lowering unit 4 is raised from the state illustrated in FIG. 2D, the tray holding antiback mechanism 11 of the tray holding unit 6 is abutted to a lower surface of the holding portion 21b of the supply tray 21, and the one supply tray 21 can be separated from the supply tray stacking portion 3 as illustrated in FIG. 2E.

Subsequently, a method for moving the separated supply tray 21 to the parts-taking-out robot 9 will be explained below. As illustrated in FIG. 1, in a state where the separated supply tray 21 is held by the tray holding unit 6, the tray raising/lowering unit 4 moves up to a level where the supply tray 21 is moved to the parts taking out robot 9. Tray holding antiback mechanisms 11 of the tray holding unit 6 are provided at two positions of both ends of the tray holding unit 6 in an x-axis direction or at four positions in total as illustrated in FIG. 1. The supply tray 21 is held by the four tray holding antiback mechanisms 11. The holding antiback mechanisms 11 extend inward of the tray holding unit 6.

The tray moving unit 5 advances in the x-axis direction to move the separated supply tray 21 held by the tray holding unit 6 to a range where the parts taking out robot 9 can take the parts out of the separated supply tray 21. This state is illustrated by a broken line in FIG. 1. In this state, a parts holding unit 10, with which the parts-taking-out robot 9 is provided, takes out parts (not shown) from the separated supply tray 21. When all the parts are taken out from the supply tray 21 to empty the supply tray 21, the tray moving unit 5 retracts in the x-axis direction to return to a predetermined position in the parts supply apparatus 1. This is the tray moving method.

A method for stacking an empty tray 22 at the empty tray stacking portion 7, the empty tray 22 being the supply tray 21 having been emptied after completion of supply of all the parts, will be explained with reference to FIGS. 3A, 3B, 3C, 3D, 3E and 3F (that are schematic views viewed from the direction shown by an arrow B of FIG. 1). In the state illustrated in 3A, the tray holding unit 6 that holds the empty tray 22 stands by below the empty tray stacking unit 8, including the empty tray stacking antiback mechanism 12 in the vertical direction. In the state illustrated in FIG. 3A, one empty tray 22 has already been held at the empty tray stacking portion 7.

Figure 3A:
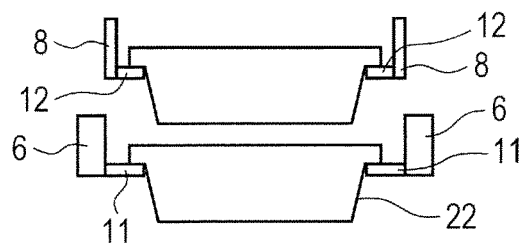
FIGS. 3A, 3B, 3C, 3D, 3E and 3F are schematic views explaining a method for containing and stacking an empty tray at a supply tray stacking portion according to the first embodiment of the invention.
Figure 3B:
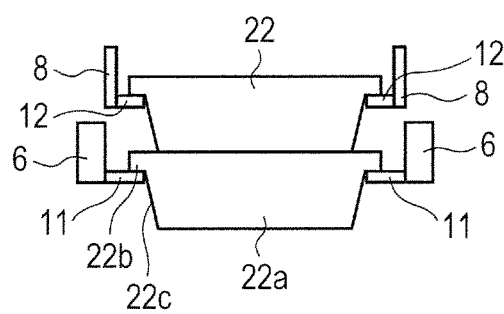
Figure 3C:
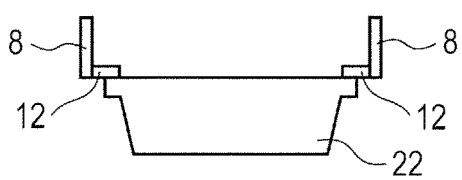

Subsequently, in the state illustrated in FIG. 3B, the tray raising/lowering unit 4 is raised so that a lower empty tray 22 is abutted to a lower surface of an upper empty tray 22. This state becomes a state where an upper surface of the holding portion 22b of the empty tray 22 is in a contact with a lower surface of the empty tray stacking antiback mechanism 12, when the tray raising/lowering unit 4 is further raised. This state is illustrated in FIG. 3C. In FIG. 3C onwards, an illustration of the upper empty tray 22 is omitted to facilitate the viewing of the drawings.

It is noted that at this moment, the tray holding unit 6 that holds the empty tray 22 and the tray holding antiback mechanism 11 have a positional relation with the empty tray stacking unit 8 and the empty tray antiback mechanism 12 so as not to spatially interfere with each other. In this embodiment, a nest-like relation in which the empty tray stacking unit 8 fits into the inside of the tray holding unit 6 is established. Further, the tray holding unit 6 and the tray holding antiback mechanism 11 that hold the upper empty tray 22 are omitted in FIGS. 3C, 3D, 3E and 3F to facilitate the viewing of the drawings.

Figure 3D:
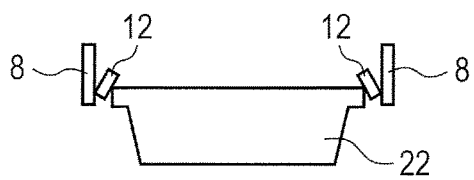
Figure 3E:
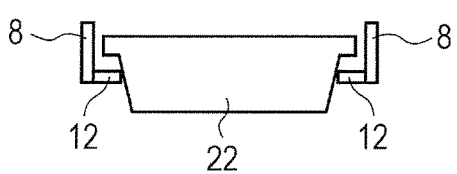
Figure 3F:
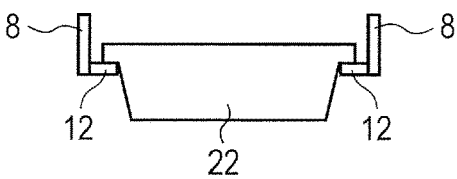

FIG. 3D illustrates a state where the tray raising/lowering unit 4 is further raised from the state illustrated in FIG. 3C while the empty tray stacking antiback mechanism 12 turns to follow the holding portion 22b of the empty tray 22. Subsequently, the tray raising/lowering unit 4 is further raised and the empty tray stacking unit 8 comes to a state for holding the emptied tray 22 from below (the state illustrated in FIG. 3E). FIG. 3F illustrates a state where the tray raising/lowering unit 4 is finally lowered and the empty tray stacking unit 8 stacks the one empty tray 22. This is the empty tray stacking method.

Figure 4:
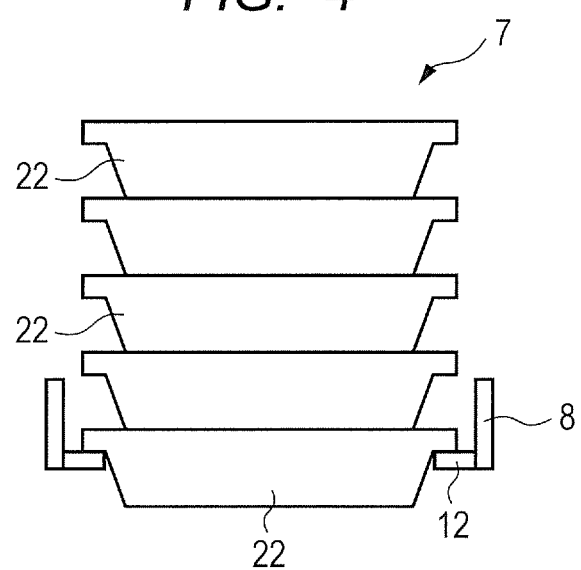
FIG. 4 is a schematic front view illustrating the empty tray stacking portion where a plurality of the empty trays are stacked according to the first embodiment of the invention.

FIG. 4 illustrates a state where the empty tray stacking unit 8 holds the empty trays 22 stacked above one another. The empty trays 22, which are raised from below by the tray raising/lowering unit 4, are stacked, and the empty tray stacking unit 8 holds the lowermost empty tray 22. In FIG. 4, five empty trays 22 are stacked, but for example the number of stacked empty trays 22 is not limited.

The tray holding antiback mechanism 11 of the tray holding unit 6 and the empty tray stacking antiback mechanism 12 of the empty tray stacking unit 8 are dimensioned to be longer than length of the holding portion 21b of the supply tray and the holding portion 22b of the empty tray 22 in a horizontal direction. Accordingly, in a state where the supply tray 21 or the empty tray 22 is held, there is a predetermined gap between a vertical portion of the tray holding unit 6 and a vertical portion of the empty tray stacking unit 8 and outer edge portions of the holding portion 21b and the holding portion 22b, respectively, as illustrated in FIGS. 2A, 2B, 2C, 2D and 2E and FIG. 4. Due to presence of the gap, the tray holding antiback mechanism 11 and the antiback mechanism 12 can turn.

As appreciated from the above explanation, the empty tray stacking unit 8 is not raised or lowered and is positioned above the supply tray stacking portion 3 in the vertical direction in a fixed state. Accordingly, the empty tray 22 is stacked by the tray raising/lowering unit 4 and no driving source is separately needed in order to stack the empty tray 22 at the empty tray stacking portion 7.

Further, as illustrated in FIG. 1, the empty tray stacking portion 7 is disposed above the supply tray stacking portion 3 in the vertical direction so that increase of an installation area can be prevented.

As explained above, supply of the parts is completed by separating one supply tray 21 from the supply tray stacking portion 3, taking out the one supply tray 21 for the parts-taking-out robot 9, and subsequently stacking the empty tray 22 at the empty tray stacking portion 7. The operation is repeatedly performed as many times as the number (of levels) of supply trays 21 stacked at the supply tray stacking portion 3.

Figure 5:
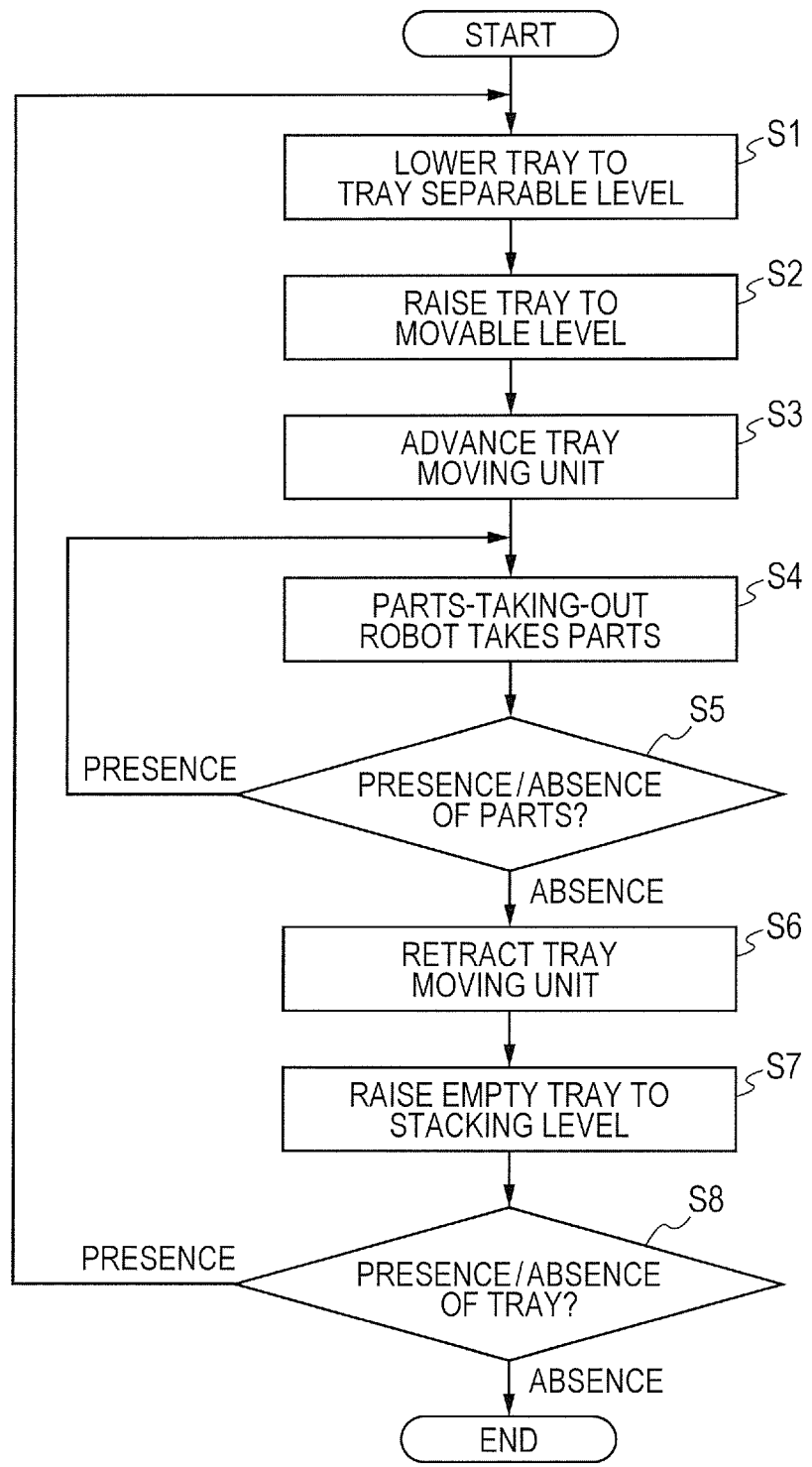
FIG. 5 is a flow chart illustrating an operation flow according to the first embodiment of the invention.

The operation as above will be explained with reference to FIG. 5. FIG. 5 is a flow chart illustrating an operation flow according to the first embodiment of the invention. When the operation is started, the tray raising/lowering unit 4 is lowered to a level where one supply tray 21 is separated (taken out) in step S1 The state is illustrated in FIGS. 2A, 2B, 2C, 2D and 2E.

When the tray holding unit 6 holds the supply tray 21, the tray raising/lowering unit 4 is raised to a level where parts can be moved to the parts taking out robot 9 in step S2. When the raising is completed, the tray moving unit 5 advances from an initial position to a second position where the parts taking out robot 9 can take out the parts in step S3 (illustrated by broken lines in FIG. 1).

In step S4, the parts taking out robot 9 takes out all of the plurality of parts contained in the supply tray 21 and the supply tray 21 becomes emptied. In step S5, a sensor (not shown) determines whether a part or parts are present or absent in the supply tray 21. If the part is absent, the procedure proceeds to a next step and if a part is present, the procedure reverts to step S4.

In step S5, if it is determined that the part is absent, the tray moving unit 5 retracts to return to the initial position in step S6. After supply of the parts, in the step S7, the empty tray 22 having returned to an upper portion of the supply tray stacking portion 3 is raised by raising of the tray raising/lowering unit 4 to a level where the empty tray 22 is stacked, and the empty tray 22 is stacked at the empty tray stacking unit 8. Subsequently, it is repeated that a supply tray 21 at a next level is separated from the supply tray stacking portion 3. In step S8, whether the supply tray 21 is present or absent is determined and the procedure is completed if no supply tray 21 is present. If the supply tray 21 is still present, the procedure returns to step S1 to repeat the above-mentioned operation.

In the first embodiment of the invention explained above, the tray moving unit 5 is provided to move the separated supply tray 21 to the parts-taking-out robot 9. However, it is not necessary to provide the tray moving unit 5, and the parts supply apparatus can be configured that the parts-taking-out robot 9 directly takes out parts from the supply tray 21 positioned at the uppermost level of the supply tray stacking portion 3. In this configuration, the empty tray stacking portion 7 is disposed above the supply tray stacking portion 3 in the vertical direction.

According to the first embodiment, the empty tray stacking portion is disposed above the supply tray stacking portion so that increase of an installation area can be prevented. Further, an empty tray 22 is stacked by the tray raising/lowering unit 4 at the empty tray stacking portion 7 so that a driving source can be reduced and costs can be reduced.

Further, after an empty tray 22 has been stacked by the tray raising/lowering unit 4 at the empty tray stacking portion 7, a new tray 21 is taken out from the supply tray stacking portion 3, so that the tray 21 can be exchanged in a short amount of time and productivity can be improved.

[Second Embodiment]

The second embodiment of the invention will be concretely explained below with reference to attached drawings. In the drawings, the same parts are denoted by the same reference numerals.

In the second embodiment, a "supply tray" and an "empty tray" are the same tray, and are functionally defined as below. The "supply tray" means a tray in each of states where a part is contained in the tray, where the tray is stacked at a supply tray stacking portion 3, and where a part is supplied to a robot 109. Further, the "empty tray" means a tray from which all the parts are supplied and the tray is therefore emptied.

Figure 6:
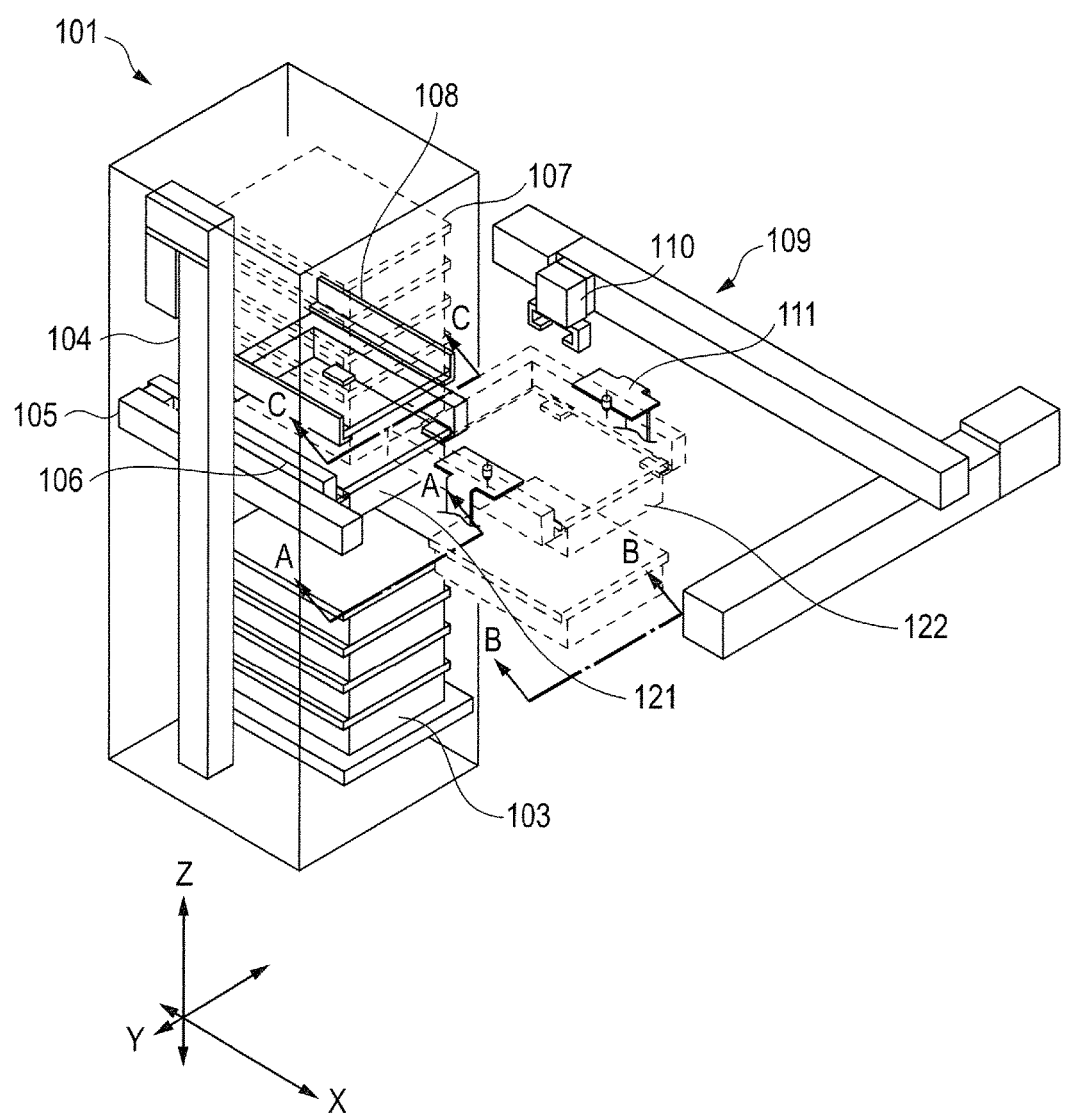
FIG. 6 is a schematic perspective view illustrating a parts supply apparatus according to a second embodiment of the invention.

FIG. 6 is a schematic perspective view illustrating a parts supply apparatus according to the second embodiment of the invention.

The second embodiment relates to a robot system including the parts supply apparatus of the first invention and a robot that will be described below.

The parts supply apparatus 101 includes a supply tray stacking portion 103 where supply trays 121, each of which contains parts 114 (not illustrated in FIG. 6), are stacked, and an empty tray stacking portion 107 where empty trays 122, which are the supply trays 121 that become emptied, are stacked. The empty tray stacking portion 107 is disposed above the supply tray stacking portion 103 in a vertical direction.

The parts supply apparatus 101 includes a tray raising/lowering unit 104 that separates one level of a supply tray 121 from the supply tray stacking portion 103 and a tray holding unit 106 with which the tray raising/lowering unit 104 is provided. The parts supply apparatus 101 further includes a tray moving unit 105 that moves the supply tray 121 that is separated to an area where a robot 109 can take the parts out, and a tray positioning portion 111 that positions the supply tray 121 in an x-axis direction and in a y-axis direction according to a raising/lowering operation (during raising in this embodiment) of the tray raising/lowering unit 104 after movement of the supply tray 121 by tray moving unit 105. The tray positioning portion 111 may be provided at the tray moving unit 105.

Figure 10:
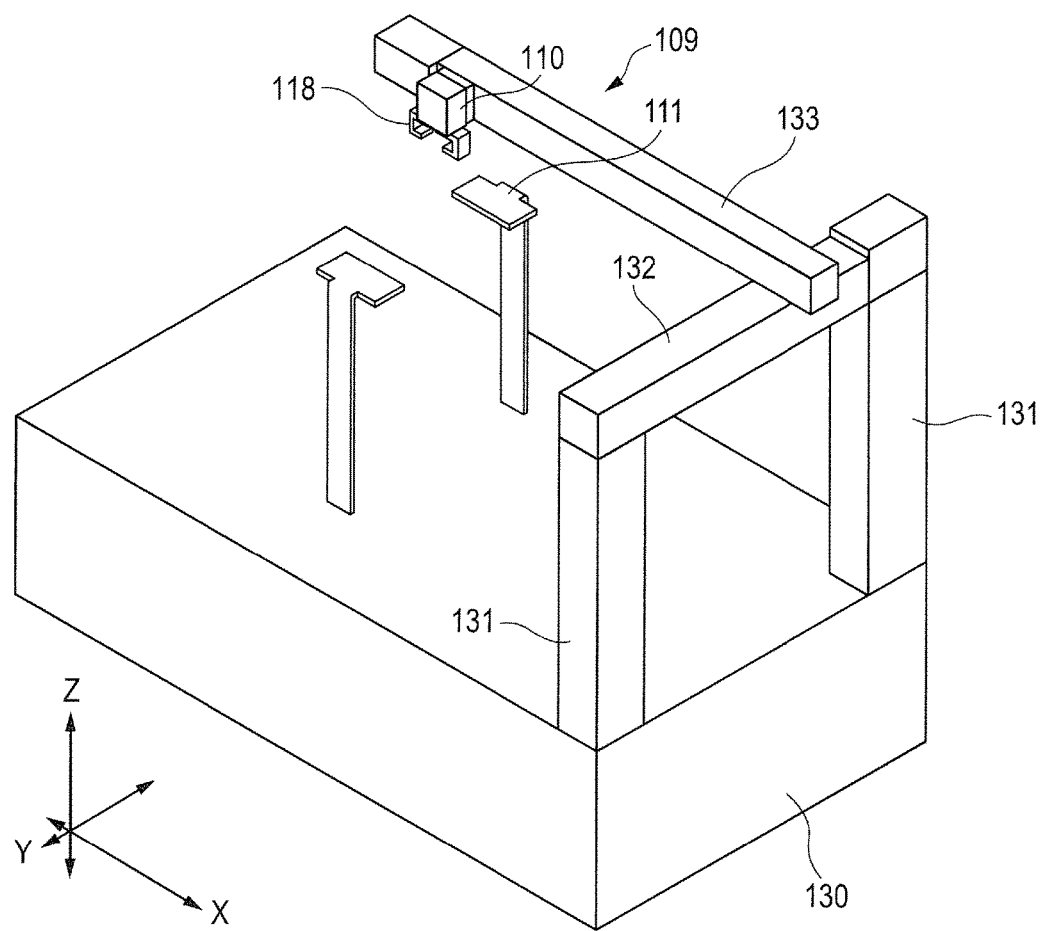
FIG. 10 is a schematic perspective view illustrating a robot used for a robot system according to the second embodiment of the invention.

As illustrated in FIG. 10, a y-axis moving unit 132 is provided on a base 130 through posts 131 in a robot 109. An x-axis moving unit 133 is mounted on a guide rail of the y-axis moving unit 132 to be movable in the x-axis direction. Further, a parts grasp device 110 is mounted on a guide rail of the x-axis moving unit 133 to be movable in the y-axis direction.

The robot 109 includes a tray positioning portion 111 that positions the supply tray 121 conveyed from the parts supply apparatus 101 on the base 130. The robot 109 includes the parts grasp device (hand) 110 with which the robot 109 is provided. The parts grasp device 110 includes a chuck portion 118 that grasps the parts (not shown).

In this way, the robot 109 includes an x-axis and a y-axis actuator to supply the parts to a predetermined position in an x-y plane. Further, this configuration can increase a degree of freedom on apparatus layout such as an arrangement of a unit and the like. Furthermore, the robot 109 includes no driving unit in a z-axis direction. Accordingly, the weight of the robot 109 can be reduced compared to a robot including a driving unit in the z-axis direction.

Additionally, in FIG. 6, the parts 114 (not shown) are taken out from the supply tray 121 by the robot 109 and then an empty tray 122, which is the supply tray 21 having been emptied, is stacked at the empty tray stacking portion 107 by the empty tray stacking unit 108.

One supply tray 121 is separated from the supply tray stacking portion 103 by the tray moving unit 105, and is passed to the robot 109. An operation thereafter until stacking is completed at the empty tray stacking portion 107 will be explained below.

The tray raising/lowering unit 104 including the tray holding unit 106 is lowered with respect to the supply tray stacking portion 103 to separate one supply tray 121. The separating method will be explained with reference to FIGS. 7A, 7B, 7C, 7D and 7E (FIGS. 7A, 7B, 7C, 7D and 7E are views viewed from the direction shown by an arrow A of FIG. 6). FIGS. 7A, 7B, 7C, 7D and 7E are schematic front views explaining a method for separating one supply tray from the supply tray stacking portion. The supply tray 121 (similarly, the empty tray 122) is a box containing parts (not shown) 114 and includes an outer circumferential edge 121a that projects outwardly from a side surface of the box around an upper portion thereof.

Figure 7A:
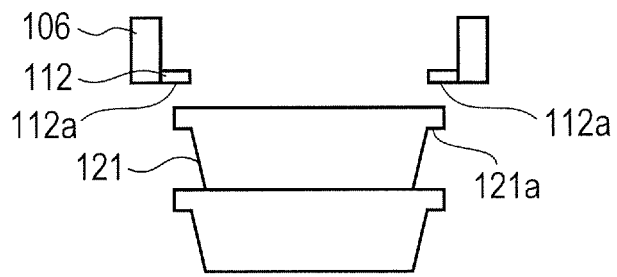
FIGS. 7A, 7B, 7C, 7D and 7E are schematic views explaining a method for separating one supply tray from a supply tray stacking portion according to the second embodiment of the invention.
Figure 7B:
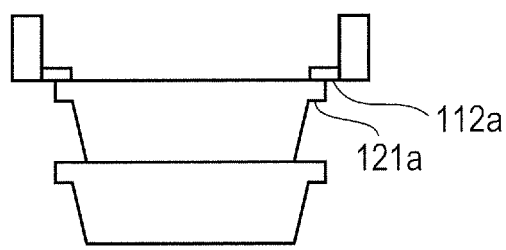
Figure 7C:
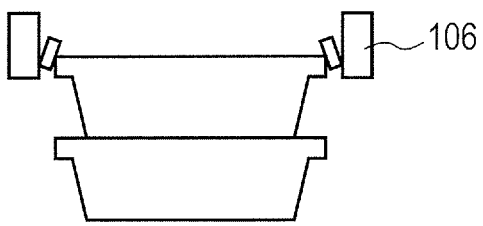

FIG. 7A illustrates a state where the tray holding unit 106, including a tray holding antiback mechanism 112, stands by above the supply tray stacking portion 103 with respect to the supply tray 121 disposed at the uppermost level of the supply tray stacking portion 103. Next, in FIG. 7B, the tray raising/lowering unit 104 is lowered and the tray holding antiback mechanism 112 is in contact with an upper surface of the outer circumferential edge 121a of the supply tray 121. FIG. 7C illustrates a state where the tray raising/lowering unit 104 is further lowered and the tray holding antiback mechanism 112 turns to follow the outer circumferential edge 121a of the supply tray 121.

Figure 7D:
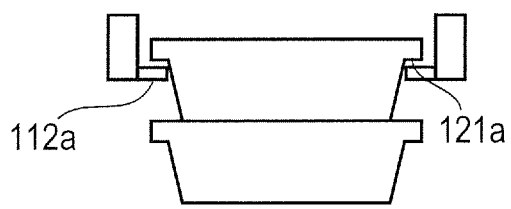
Figure 7E:
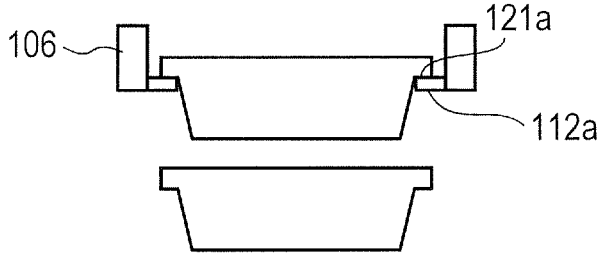

In FIG. 7D, the tray raising/lowering unit 104 is further lowered, and the tray holding unit 106 comes to a state where it can hold the supply tray 121 from below. In this state, projections 112a of the tray holding antiback mechanism 112 are positioned below the outer circumferential edge 121a of the supply tray 121. Finally, when the tray raising/lowering unit 104 is raised from the state illustrated in FIG. 7D and the projections 112a of the tray holding antiback mechanism 112 are in contact with a lower surface of the outer circumferential edge 121a of the supply tray 121, the tray holding unit 106 comes to a state where it can separate one (level of) supply tray 121 from the supply tray stacking portion 103. FIG. 7E illustrates a state where the supply tray 121 is completely separated. Thus, one supply tray 121 is separated.

A method for passing the separated supply tray 121 to the robot 109 by the tray moving unit 105 will be explained below with reference to FIGS. 8A, 8B, 8C, 8D, 8E and 8F (that are schematic views viewed from the direction shown by an arrow B of FIG. 6). FIGS. 8A, 8B, 8C, 8D, 8E and 8F are schematic font views and side views illustrating operations in which a supply tray 121 is moved from the supply tray stacking portion 103, and the supply tray 121 is positioned and is passed to the robot 109. In FIGS. 8A, 8B, 8C, 8D, 8E and 8F, views from a front of the parts supply apparatus 101 are illustrated on the left side of the figures, and views from a side of the parts supply apparatus 101 are illustrated on the right side of the figures.

Figure 8A:
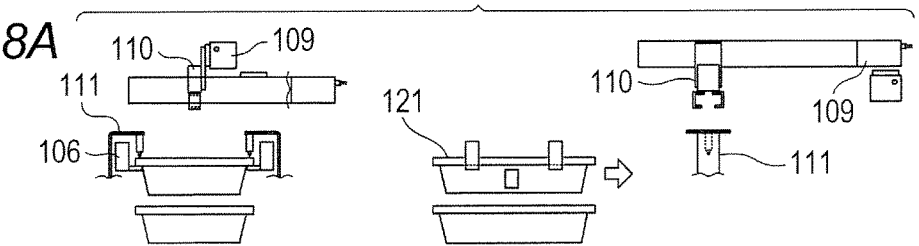
FIGS. 8A, 8B, 8C, 8D, 8E and 8F are schematic front views and side views illustrating a process in which the supply tray is moved from the supply tray stacking portion, and the supply tray is positioned and is passed to a parts-taking-out robot according to the second embodiment of the invention.

A state illustrated in FIG. 8A is the state where the tray holding unit 106 holds the separated supply tray 121 and the tray raising/lowering unit 104 is raised to a tray-taking-out level.

Figure 8B:
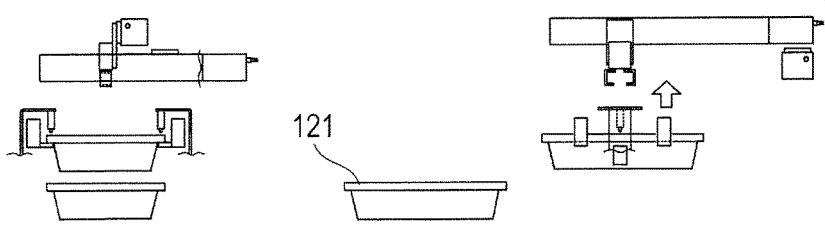
Figure 8C:
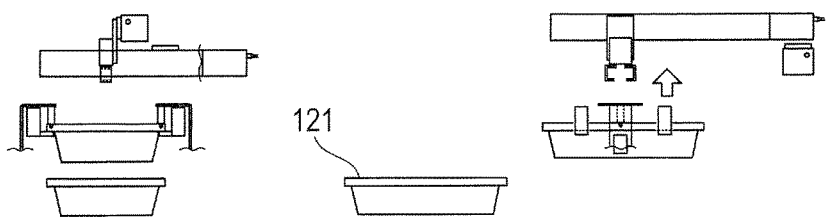

In a state illustrated in FIG. 8B, the tray moving unit 105 advances in the x-axis direction (see FIG. 6) to cause the tray holding unit 106 to take out the supply tray 121 to a taking out range of the robot 109. Next, in a state illustrated in FIG. 8C, after the supply tray 121 has been taken out, the supply tray 121 is raised by the tray raising/lowering unit 104 to a level where the supply tray 121 is positioned by the tray positioning unit 111. In a state of FIG. 8D, the supply tray 121 is positioned and then the supply tray 121 is further raised to a level where the robot 109 can perform taking-out.

Figure 8D:
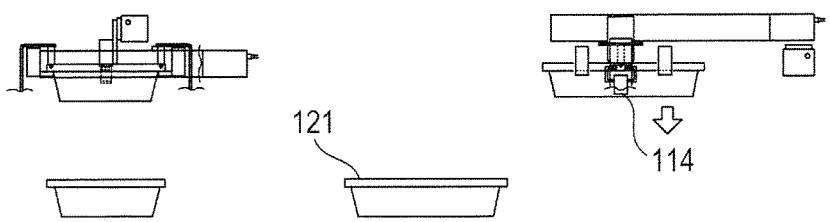
Figure 8E:
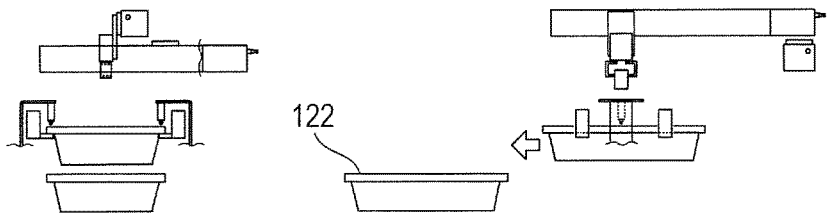

In the state of FIG. 8D, the parts grasp device 110 with which the robot 109 is provided grasps the parts 114 in the supply tray 121. In a state of FIG. 8E, after the parts 114 have been grasped, the supply tray 121 is lowered by the tray raising/lowering unit 104 to the taking out level of the supply tray 121.

Figure 8F:
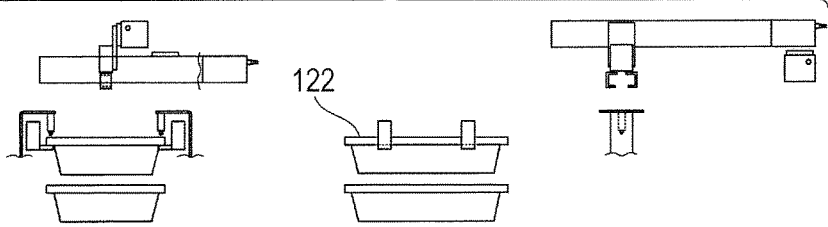

In a state of FIG. 8F, the tray moving unit 105 retreats in the x-axis direction with an empty tray 122, which is the supply tray 121 that was emptied of all the parts 114, and moves the empty tray 122 to a position where the empty tray 122 can be stacked at the empty tray stacking portion 107. This completes the method for passing the supply tray 121 to and from the robot 109. Subsequently, the robot 109 moves while grasping the parts 114 to start an automated assembly operation.

Next, a method for stacking and containing, at the empty tray stacking portion 107, the empty tray 122 will be explained with reference to FIGS. 9A, 9B, 9C, 9D and 9E (that are schematic views viewed from the direction shown by an arrow C of FIG. 6). FIGS. 9A, 9B, 9C, 9D and 9E are schematic front views explaining the method for containing and stacking the empty tray 122 at the empty tray stacking portion 107.

Figure 9A:
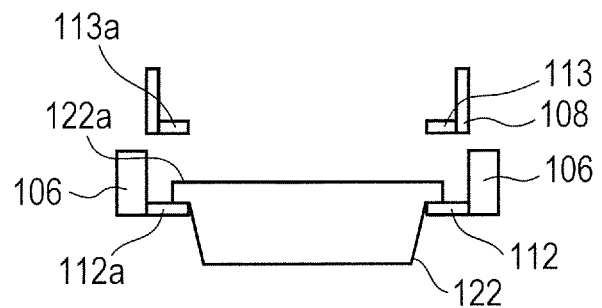
FIGS. 9A, 9B, 9C, 9D and 9E are schematic front views explaining a method for containing and stacking an empty tray at an empty tray stacking portion according to the second embodiment of the invention.

FIG. 9A illustrates a state where the tray holding unit 106, that holds the empty tray 122 that is emptied, stands by below the empty tray stacking unit 108 including the empty tray stacking antiback mechanism 113 in the vertical direction.

Figure 9B:
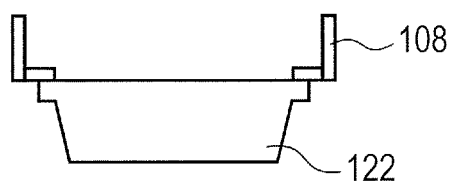

In FIG. 9B, the tray raising/lowering unit 104 is raised and an upper surface of the outer circumferential edge 122a of the empty tray 122 is in contact with a lower surface of the projections 113a of the empty tray holding antiback mechanism 113. In FIGS. 9B, 9C, 9D and 9E, an illustration of the tray holding unit 106 that holds the empty tray 122 is omitted to facilitate the viewing of the drawings.

Figure 9C:
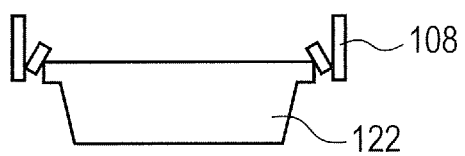
Figure 9D:
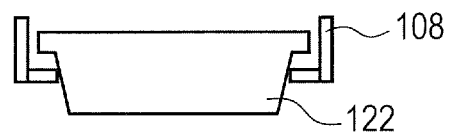

In FIG. 9C, the tray raising/lowering unit 104 is further raised and the projections 113a of the empty tray stacking antiback mechanism 113 turn to follow the outer circumferential edge 122a of the empty tray 122. Further, FIG. 9D illustrates a state where the tray raising/lowering unit 104 is further raised and the empty tray stacking unit 108 is present at a position so as to receive the empty tray 122.

Figure 9E:
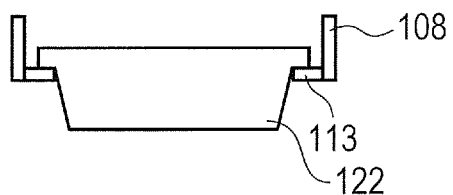

FIG. 9E illustrates a state where the tray raising/lowering unit 104 is lowered and the empty tray stacking unit 108 stacks the empty tray 122. In a case where a plurality of empty trays 122 are stacked, they are stacked on the empty tray 122 in FIG. 9E. However, illustration is omitted here, and only one empty tray 122 is illustrated for convenience of explanation. This is the empty tray stacking and containing method.

One supply tray 121 is separated from the supply tray stacking portion 103 explained above and the one supply tray 121 is taken out to the robot 109. When supply of the parts 114 is completed, the emptied supply tray 121 is stacked as the empty tray 122 at the empty tray stacking portion 107. The above operation is repeatedly performed as many times as the number (of levels) of supply trays 121 stacked at the supply tray stacking portion 103 and is completed.

The tray holding antiback mechanism 112 and the empty tray stacking antiback mechanism 113 are the same mechanism, and the projections 112a and 113a of each is configured to be capable of turning upward but not downward with respect to a horizontal axis.

The second embodiment can be used for a parts supply apparatus of an automated assembly apparatus and can also be used for supplying parts to another apparatus.

According to the parts supply apparatus and the parts supply method of the second embodiment, the following effects can be obtained. The tray moving unit is raised or lowered to raise or lower the supply tray to supply parts to the robot. With this configuration, an inertia moment of a moving joint is smaller than that of a conventional parts taking out robot including a raising/lowering unit. Accordingly, vibration upon passing the parts can be reduced to a minimum. Further, even in a case where an x-axis linear motion joint and a y-axis linear motion joint move at a high speed, vibration of the parts grasp device for grasping parts can be reduced to a minimum since the inertia moment of the robot is small.

Therefore, there can be provided the parts supply apparatus at low costs that reduces a number of axes of the movement and that can prevent grasp misalignment of grasped parts and scratch generated by mutually rubbing parts and a claw due to vibration.

The above-mentioned robot does not necessarily need a raising/lowering unit, and thus, it may not be necessary to provide a guide for an actuator at an upper portion of the parts. This configuration can reduce concerns that grease is dispersed and deposited on the parts upon a raising or lowering operation of the actuator.

Since the supply tray is raised by the raising/lowering unit that separates one supply tray from the supply tray stacking portion, a number of axes can be reduced so that the parts supply apparatus can be provided at low costs.

As the supply tray moves up and down, the supply tray positioning portion may be disposed on a locus of the up-and-down movement thereof, and the supply tray may be positioned by using the up-and-down movement of the tray so that a number of axes is reduced and the parts supply apparatus can be provided at low costs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-078134, filed Apr. 7, 2015, Japanese Patent Application No. 2015-090175, filed Apr. 27, 2015, and Japanese Patent Application No. 2016-064893, filed Mar. 29, 2016, which are hereby incorporated by reference herein in their entirety.

What is claimed is:

1. A robot system, comprising:
a parts supply apparatus including:
- a supply tray stacking portion configured to hold a plurality of supply trays in a stacked arrangement, each of the supply trays being capable of containing parts therein;
- a tray raising/lowering unit having a tray holding unit and configured to separate one of the supply trays from the supply tray stacking portion; and
- an empty tray stacking portion configured to hold a plurality of the supply trays in a stacked arrangement, the empty tray stacking portion being disposed above the supply tray stacking portion in a vertical direction;

a robot including:
- a grasping device capable of grasping at least one of the parts in the one of the supply trays separated from the supply tray stacking portion;
- an x-axis moving unit configured to move the grasping device in an x-axis direction; and
- a y-axis moving unit configured to move the grasping device in a y-axis direction; and a tray moving unit configured to move the one of the supply trays that is separated to the robot, wherein the robot does not have a driving unit configured to move the grasping device in the vertical direction, and wherein the tray raising/lowering unit is configured to raise the one of the supply trays that is separated up to a position where the grasping device of the robot is capable of grasping the at least one of the parts in the one of the supply trays.

2. The robot system according to claim 1, wherein the robot is provided on a base, and
wherein the robot includes a supply tray positioning portion that positions the one of the supply trays that is separated on the base.

3. The robot system according to claim 1, wherein the tray raising/lowering unit is further configured to stack the one of the supply trays that is separated in the empty tray stacking portion.

4. The robot system according to claim 1, wherein the tray holding unit includes a one-way mechanism that separates and moves the one of the supply trays that is separated.

5. A robot system, comprising:
a supply tray stacking portion configured to hold a plurality of supply trays stacked in a stacked arrangement, each of the supply trays being capable of containing parts therein;

a vertical movement mechanism configured to separate one of the supply trays from the supply tray stacking portion at a predetermined height; and a robot including:
- a grasping device capable of grasping at least one of the parts in the one of the supply trays separated from the supply tray stacking portion;
- an x-axis moving unit configured to move the grasping device in an x-axis direction; and
- a y-axis moving unit configured to move the grasping device in a y-axis direction; and a horizontal movement mechanism configured to move the separated supply tray along a horizontal plane to the robot, wherein the robot does not have a driving unit configured to move the grasping device in the vertical direction, and wherein the vertical movement mechanism is configured to move the horizontal movement mechanism to the predetermined height.

6. The robot system according to claim 5, wherein the robot is provided on a base, and
wherein the robot includes a supply tray position mechanism that positions the separated supply tray on the base.

* * * * *